United States Patent [19]

Gasmena

[11] Patent Number: 5,417,744
[45] Date of Patent: May 23, 1995

[54] OPTICALLY CLEAR HYDROPHOBIC COATING COMPOSITION

[75] Inventor: Roland L. Gasmena, Anaheim, Calif.

[73] Assignee: Ameron, Inc., Pasadena, Calif.

[21] Appl. No.: 175,133

[22] Filed: Dec. 29, 1993

[51] Int. Cl.$^6$ ............................................... C09K 3/18
[52] U.S. Cl. ............................ 106/2; 106/287.13; 106/287.14; 523/169; 524/765; 524/767; 528/33; 528/42
[58] Field of Search .................. 106/2, 287.13, 284.14, 106/14.11, 14.13, 14.41; 523/169; 528/33, 42; 524/765, 767

[56] References Cited

U.S. PATENT DOCUMENTS

| | | | |
|---|---|---|---|
| 2,927,909 | 3/1960 | Lyons et al. | 260/42 |
| 3,372,052 | 3/1968 | Polniaszek | 117/72 |
| 3,427,271 | 2/1969 | McKellar | 260/29.2 |
| 3,442,664 | 5/1969 | Heine | 106/287.14 |
| 3,579,540 | 5/1971 | Ohlhausen | 523/169 |
| 3,972,850 | 8/1976 | Hamilton et al. | 260/37 |
| 4,465,712 | 8/1984 | McVie | 524/765 |
| 4,846,886 | 7/1989 | Fey et al. | 106/2 |
| 4,874,431 | 10/1989 | Fey et al. | 106/2 |
| 4,985,286 | 1/1991 | Kurita et al. | 428/34.7 |
| 5,051,129 | 9/1991 | Cuthbert et al. | 106/2 |
| 5,073,195 | 12/1991 | Cuthbert et al. | 106/2 |
| 5,112,393 | 5/1992 | Engel et al. | 106/2 |

Primary Examiner—Anthony Green
Attorney, Agent, or Firm—Christie, Parker & Hale

[57] ABSTRACT

An optically clear hydrophobic coating is prepared by combining in the presence of water fluorinated polysiloxane having multiple hydrolyzable side groups selected from the group including alkyl, aryl, or alkoxy groups having from one to four carbon atoms, with polysiloxane, with polyester modified polysiloxane, with acid, and with alcohol. The polysiloxane ingredients are combined and blended together. The acid and alcohol ingredients are combined together and mixed with the polysiloxane ingredients. The polysiloxane ingredients undergo hydrolysis and polycondensation/polymerization reactions to form a fluorinated polyester modified polysiloxane polymer that when applied to a substrate surface cures at ambient temperatures to form a durable, weather, chemical and heat resistant, optically clear hydrophobic protective coating.

26 Claims, No Drawings

OPTICALLY CLEAR HYDROPHOBIC COATING COMPOSITION

FIELD OF THE INVENTION

This invention relates to the formation of an optically clear coating that serves to reduce the surface energy of a substrate for purposes of promoting liquid run-off, enhancing the substrate's weather, heat and chemical resistance.

BACKGROUND OF THE INVENTION

Protective coatings are needed to protect a variety of substrates from premature deterioration and destruction due to the particular environment that the substrate is subjected to. Typical substrates for which such protection is desired may include building materials such as masonry, wood, and steel. Applying a protective coating onto these materials forms a barrier between the surface of the substrate and the environment to the protect the underlying material from deterioration which, if left unchecked, could ultimately result in not only aesthetic damage but in the mechanical failure of the substrate.

Coatings used to protect such building materials are known in the art and typically take the form of a water-repellant composition that is applied to the surface of the substrate in liquid form and then allowed to cure. Such water-repellant coatings are known to comprise siloxane compounds which participate in polycondensation reactions upon application to the substrate surface via evaporation to form a strong polymer barrier. These coatings are typically applied to the surface of the substrate in relatively thick films to form a substantial physical barrier between the environment and the substrate surface. These coatings may also be colored or colorless, depending on the need to preserve the underlying aesthetic features of the substrate. For example, when using a protective coating to protect a substrate surface such as wood used for outdoor furniture or decks and the like it is desirable that the coating be clear to preserve the aesthetic features of the wood surface.

Protective coatings are also needed to protect substrates other then the typical building materials mentioned above. For instance, protective coatings may be desired to protect the surface of objects made from plastic or glass from the harmful effects of weather, heat and chemicals. Depending on the particular object and/or function of the object made from such materials, the known protective coatings designed for use with the above mentioned building materials may not be well suited for providing the desired protection to the surface of such materials.

Objects made from plastic or glass materials are typically made from such material due to either a particular aesthetic or functional purpose. For example, glass and plastic materials such as Plexiglass and the like are commonly used to make windows for homes, buildings, automobiles, or airplanes and the like. The desired feature of a window is the ability to look through it to view an object on the other side. Windows are typically installed to separate an indoor environment from an outdoor environment while preserving the ability to view one environment from the other. Accordingly, at least one surface of the window is exposed to the same elements that are known to cause weather damage and deterioration in other building materials.

Glass is inherently weather, chemical and heat resistant, therefore, a protective coating to enhance such resistance is not desirable. However, plastic materials do not display the same degree of weather, chemical and heat resistance as glass and, may therefore require treatment with a protective coating to protect the surface of the plastic from deterioration. A factor known to adversely effect the usefulness of windows made from either clear plastic or glass is the accumulation of water on the surface of the window. Water accumulation on the surface of a window, due to rain or contact with a body of water, makes viewing objects though the glass difficult, typically distorting the object on the other side.

Accordingly, a protective coating is needed to both protect the surface of clear plastic materials from the harmful effects of weather, chemicals and heat, and minimize the ability of substrate surfaces to accumulate water. It is desirable that the protective coating be optically clear so that it will neither impair the function of the substrate surface nor detract from the aesthetic features of the underlying substrate surface. It is desirable that the protective coating be useful to protect a variety of substrates, as well as glass and clear plastic, where optical clarity is required for purposes of looking through the substrate surface or for retaining the underlying aesthetic features of the substrate surface.

It is also desirable that the protective coating be capable of retaining properties of optical clarity and hydrophobicity upon submersion in water. It is desirable that the protective coating be easy to apply without special equipment or procedures.

SUMMARY OF THE INVENTION

This invention provides such a protective coating that is both optically clear and hydrophobic. The optically clear hydrophobic coating is prepared by combining in the presence of water a fluorinated polysiloxane, a polysiloxane, a polyester modified polysiloxane, an acid, and an alcohol.

The fluorinated polysiloxane has the formula

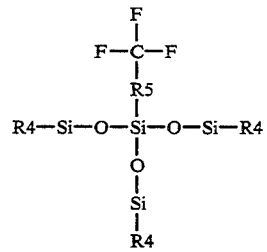

where R4 may be selected from the group including hydroxy groups or hydrolyzable side groups including alkyl, aryl, or alkoxy groups, and where each R4 group may either be the same or different than other R4 groups, and where the alkyl, aryl, or alkoxy groups comprise in the range of from one to four carbon atoms, and where R5 may comprise an alkane group having in the range of from two to four carbon atoms.

The polysiloxane combined with the fluorinated polysiloxane has the formula

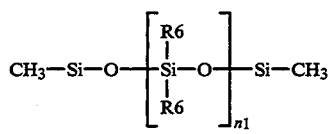

where R6 comprises an alkane having in the range of from one to three carbon atoms, and where each R6 group may be the same or different, and where $n_1$ is in the range of from one to five.

The polyester modified polysiloxane combined with the polysiloxane and fluorinated polysiloxane has the formula

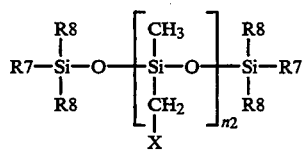

where R7 is selected from the group consisting of alkyl, aryl, and alkoxy groups having in the range of from one to six carbon atoms, where R8 comprises an alkyl group having in the range of from one to three carbon atoms, where $n_2$ is in the range of from one to five, and where X comprises a polyester group.

The polyester group has the formula

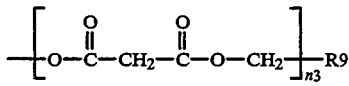

where R9 is selected from the group consisting of a hydroxy or an alkoxy group, and where the alkoxy group comprises in the range of from one to five carbon atoms, and where $n_3$ is in the range of from one to two.

The polysiloxane ingredients are blended together in the desired proportions and combined with an acid and alcohol mixture. The polysiloxane ingredients undergo hydrolytic polycondensation and polymerization to form a fluorinated polyester modified polysiloxane polymer that when applied to a substrate surface cures at ambient temperatures to form a durable, weather, chemical and heat resistant, optically clear hydrophobic coating.

DETAILED DESCRIPTION

An optically clear coating for decreasing the surface energy of a substrate surface and enhancing the weather, heat and chemical resistance of the substrate may have as significant ingredients a fluorinated polysiloxane, a polysiloxane, a polyester modified polysiloxane, water, an acid, and an alcohol. A preferred optically clear coating composition may be prepared according to principles of this invention by combining in the presence of water:

(a) a fluorinated polysiloxane having the formula

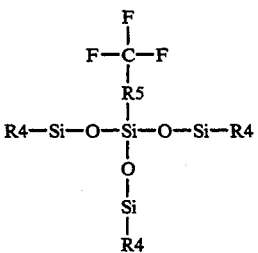

where R4 may be selected from the group including hydroxy groups or hydrolyzable side groups including alkyl, aryl, or alkoxy groups, and where each R4 group may either be the same or different than other R4 groups, and where the alkyl, aryl, or alkoxy groups comprise in the range of from one to four carbon atoms, and where R5 may comprise an alkane group having in the range of from two to four carbon atoms; with (b) a polysiloxane having the formula

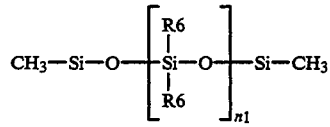

where R6 may comprise an alkane having in the range of from one to three carbon atoms, and where each R6 group may be the same or different than the other R6 group, where $n_j$ may be in the range of from one to five, and where n is an average number of repeating units. For example, in a composition with n=3, some of the polysiloxane molecules may have one or two repeating units and some may have four or five, but most have three and the average is about three.; with (c) a polyester modified polysiloxane having the formula

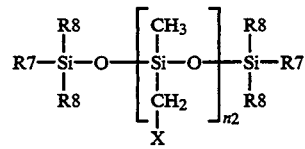

where R7 may comprise an alkyl, aryl, or alkoxy group having in the range of from about one to six carbon atoms, where R8 may comprise an alkyl group having in the range of from one to three carbon atoms, where $n_2$ may be in the range from one to five, where $n_2$ is an average number of repeating units, and where X comprises a polyester group having the formula

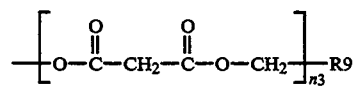

where R9 comprises a hydroxy group or an alkoxy group, the alkoxy group having in the range of from about one to five carbon atoms, where $n_3$ may be in the range of from one to two, and where $n_3$ is an average number of repeating units; with (d) an aqueous acid such as acetic acid or aqueous inorganic acids such as hydrochloric acid, nitric acid, sulfuric acid, phosphoric acid, and the like, with;

(e) an alcohol having in the range of from about one to four carbon atoms.

With respect to the fluorinated polysiloxane ingredient, it is desired that the R4 group comprise less than about five carbon atoms to facilitate hydrolytic polycondensation and/or polymerization. A fluorinated polysiloxane comprising R4 groups having greater than four carbon atoms may adversely effect, via steric hindrance, the fluorinated polysiloxane's ability to readily participate in the hydrolytic polycondensation and/or polymerization reactions forming the coating composition. Additionally, it is desired that the R4 group comprise less than five carbon atoms so that the alcohol analog of the R4 group formed via during the hydrolysis and polymerization of the fluorinated polysiloxane is easily evaporated, speeding the curing time of the coating composition.

The optically clear coating composition prepared according to principles of this invention may comprise in the range of from 0.2 to 1 percent by weight fluorinated polysiloxane. The fluorinated polysiloxane serves to increase the hydrophobicity, and thus decrease the surface energy, of the silicon polymer formed according to principles of this invention. A coating composition comprising less than about 0.2 percent by weight of the fluorinated polysiloxane does not display a desired immediate increase in the hydrophobicity of a coated substrate upon application. Additionally, the hydrophobic properties that do eventually develop on the substrate surface after application decrease sharply as the coating ages.

A coating composition comprising greater than about 1 percent by weight of the fluorinated polysiloxane does not increase the hydrophobic properties of the coating beyond that obtained by using a lesser amount. Accordingly, the range of the fluorinated polysiloxane used in preparing the optically clear coating reflects an optimum amount that is both economical and provides the desired degree of hydrophobicity.

A preferred coating composition comprises approximately 0.5 percent by weight fluorinated polysiloxane. A preferred fluorinated polysiloxane comprises 3,3,3 trifluoropropyl trimethoxysilane produced by Hüls Americal, Inc. of Piscataway, New Jersey under the product name PS 184-S, and PCR Inc. of Gainseville Florida under the product name PCR 12092-3.

With respect to the polysiloxane ingredient, the coating composition may comprise in the range of from ten to sixty percent by weight polysiloxane. The polysiloxane does not participate in the reaction forming the optically clear coating, but rather is bound in the polymer network to provide lubricity during application of the coating and provide initial hydrophobic characteristics to the substrate surface. A coating composition comprising less than about ten percent by weight of the polysiloxane does not cover the substrate surface evenly due to decreased lubricity, reducing the consistency of the coating's ability to effect water run-off. A coating composition comprising greater than about sixty percent by weight of the polysiloxane has been shown to make application difficult, causing streaking and difficulties in polishing, which ultimately reduces the clarity of the coating. A preferred coating composition may comprise approximately thirty percent by weight of the polysiloxane.

A preferred polysiloxane may have an average viscosity in the range of from ten centistokes (cSt) to fifty cSts. The viscosity of the polysiloxane ingredient is directly proportional to the value of $n_1$. Accordingly, a polysiloxane comprising an $n_1$ in the range of from one to five represents a polysiloxane having a viscosity within the desired range. A coating composition comprising a polysiloxane having a viscosity greater than about fifty cSts does not provide an optically clear surface because the relatively high viscosity of the composition makes polishing the coating to an optically clear finish unobtainable. A preferred polysiloxane comprises polydimethyl polysiloxane produced by Dow Corning of Midland, Michigan under the product name 200 FLUID; BYK CHEMIE of Wallingford Connecticut under the product name BYK396.

With respect to the polyester modified polysiloxane ingredient, the coating composition may comprise in the range of from 0.05 to 0.2 percent by weight polyester modified polysiloxane. The polyester modified polysiloxane serves to improve surface tension and improve substrate wetting. A coating composition comprising less than about 0.05 percent of the polyester modified polysiloxane displays both poor hydrophobic properties and poor coating durability. A coating comprising greater than about 0.2 percent by weight of the polyester modified polysiloxane displays decreased optical clarity, ultimately developing a yellow color with time. A preferred coating composition comprises approximately 0.13 percent by weight of the polyester modified polysiloxane.

It is desired that the polyester modified polysiloxane have an average viscosity in the range of from ten cSts to fifty cSts. The viscosity of the polyester modified polysiloxane is directly proportional to the value of $n_2$. Accordingly, a polyester modified polysiloxane comprising an n? in the range of from one to five represents a polyester modified polysiloxane having a viscosity within the desired range. A polyester modified polysiloxane having a viscosity of greater than about fifty cSts produces a coating composition that is resinous, has an increased curing or drying time, and is difficult to polish to an optically clear surface. A preferred polyester modified polysiloxane comprises polyester polydimethyl polysiloxane produced by BYK CHEMIE under the product name BYK 371.

With respect to the acid ingredient, the coating composition may comprise in the range of from five to twenty-five percent by weight of the acid. The acid may comprise an aqueous acetic acid or aqueous inorganic acid which serves to catalyze the hydrolytic polycondensation of the polysiloxane resins forming the ambient curing optically clear coating. It is desired that the acid have a pH of less than about five to both enhance the compatibility and promote the hydrolytic polycondensation of the polysiloxane resins. A coating composition comprising less than about five percent by weight of the acid displays an increased cure time, which effectively increases the period before which the desired hydrophobic properties of the coating can occur. A coating composition comprising greater than twenty-five percent by weight acid displays a cure time that is shorter than the time needed to apply the coating, making application and polishing of the coating to an optically clear surface difficult. The acid may be selected from the group of aqueous acids including acetic acid or inorganic acids such as hydrochloric acid, nitric acid, sulfuric acid, phosphoric acid and the like. A preferred acid comprises phosphoric acid. A preferred aqueous phosphoric acid solution may comprise approximately 85 percent phosphoric acid. A particularly preferred coating composition comprises approximately nine percent of the 85 percent phosphoric acid.

With respect to the alcohol ingredient, a coating composition may comprise in the range of from about forty to seventy percent by weight alcohol. The alcohol ingredient serves to reduce the viscosity of the coating composition to both promote application and control the film thickness of the coating. A coating composition comprising less than about forty percent of the alcohol results in a rapid build up of the coating material during application, making polishing to an optically clear surface difficult. A coating composition comprising more than about seventy percent by weight of the alcohol decreases the viscosity of the coating, making a desired coating film thickness unobtainable via single application, thus requiring multiple applications to obtain the desired hydrophobic surface properties. A particularly preferred alcohol is isopropyl alcohol. A particularly preferred coating composition comprises approximately sixty percent alcohol.

With respect to water, it is desired that the coating composition comprise in the range of from 0.1 to 10 percent by weight water. The water ingredient may comprise water present in the aqueous acid solution, free water added to the reaction, or water present as atmospheric moisture. The water serves to facilitate the hydrolytic polycondensation of the polysiloxane resins by ionization, forming hydrogen ion ($H^+$) and hydroxyl ion ($OH^-$). A coating composition comprising less than about 0.1 percent water does not comprise a sufficient amount of $H^+$ ions and $OH^-$ ions to promote the hydrolytic polycondensation of the polysiloxane resins. A coating composition comprising greater than about ten percent water comprises more water than that needed to effect hydrolytic polycondensation and displays an increased cure time due to the additional time needed to evaporate the excess water. A preferred coating composition comprises approximately two percent water.

The coating composition may be prepared by combining the fluorinated polysiloxane, polysiloxane, and polyester polysiloxane according to the previously described proportions, and blending together the three polysiloxane ingredients until the composition is clear. In a separate container, the alcohol and acid ingredients are combined according to the previously described proportions and blended together. The acid and alcohol composition is added to the polysiloxane composition slowly while maintaining a high speed of mixing. During the mixing of the polysiloxane ingredients and the acid and alcohol composition it is desired that the temperature of the mixture be maintained below about 100° F. to promote a controlled reaction of the chemical ingredients.

During the mixing of the polysiloxane ingredients and the acid and alcohol composition the ingredients are believed to undergo hydrolysis and polycondensation reactions which are exothermic in nature, causing the temperature of the composition to increase. It is desired that the temperature of the composition be maintained below about 100° F. to promote a controlled reaction, and not accelerate the chemical reaction to form a gel. The mixture of polysiloxane ingredients and acid and alcohol composition is allowed to stand for approximately three hours to obtain complete reaction between the chemical ingredients via polycondensation.

To further control the polycondensation reaction, the above described composition is diluted to approximately twenty percent by weight by the addition of a solvent. Diluting the composition with a solvent serves to retard the hydrolysis and polycondensation reactions, thereby allowing the composition to be stored in a sealed container for future use. Upon the opening of the container and application of the composition the polycondensation reactions are driven to completion, and the composition is cured to a provide a durable hydrophobic coating, by the evaporation of the solvent. Suitable solvents are miscible with the composition and may include alcohols, such as those alcohols previously described for the alcohol ingredient of the composition, glycols such as glycol acetates and the like, and water, providing the acidity of the composition is maintained between a pH of about three and four. A preferred solvent comprises a mixture of isopropyl alcohol and ethanol. A preferred weight ratio of isopropyl alcohol to ethanol is approximately 1:1.

While not wanting to be bound by any particular theory or mechanism, it is believed that the optically clear coating is produced in the following manner. For purposes of clarity it is to be understood that the chemical ingredients referred to below in the context of explaining possible reaction mechanisms are the same, and have the same chemical formulas and chemical groupings, as the chemical ingredients previously described. Upon the addition of the aqueous acid and alcohol composition to the blended fluorinated polysiloxane, polysiloxane, and polyester modified polysiloxane composition it is believed that one or more of the R4 groups of the fluorinated polysiloxane undergoes a hydrolysis reaction with the ionization products of the water to form an alcohol analog of the R4 group and a hydroxy substituted fluorinated polysiloxane, as shown in exemplary Reaction (1).

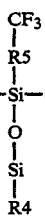

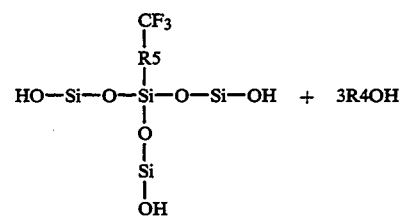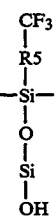

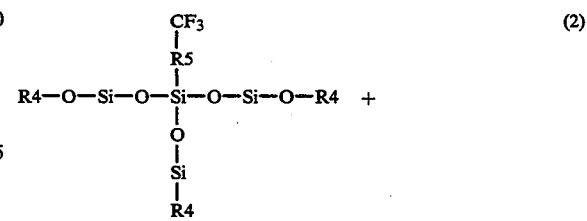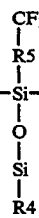

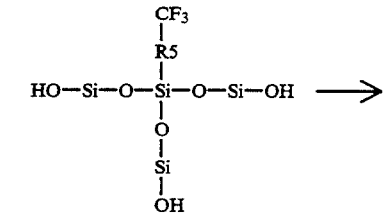

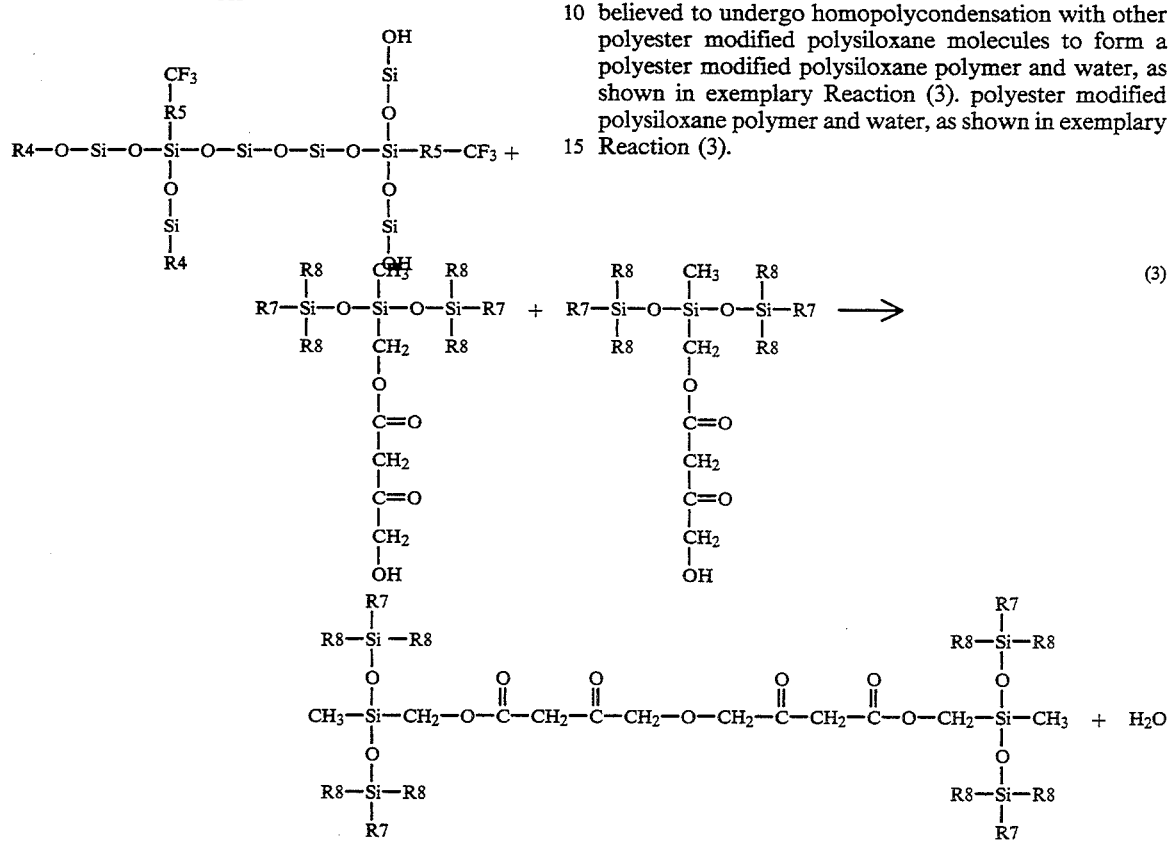

To facilitate the heteropolymerization reaction of Reaction (2), it is preferred that more than one R4 group undergo hydrolysis and substitution with a hydroxy group. Multiple hydroxy substitutions serve to facilitate the heteropolymerization of the hydroxy substituted fluorinated polysiloxane and the fluorinated polysiloxane by providing additional reaction sites.

Upon addition of the aqueous acid and alcohol composition, the polyester modified polysiloxane is also believed to undergo homopolycondensation with other polyester modified polysiloxane molecules to form a polyester modified polysiloxane polymer and water, as shown in exemplary Reaction (3). polyester modified polysiloxane polymer and water, as shown in exemplary Reaction (3).

The hydroxy substituted fluorinated polysiloxane formed in Reaction (1) may also undergo heteropolycondensation with the polyester modified polysiloxane, forming a fluorinated polyester modified polysiloxane molecule and water as shown in Reaction (4)

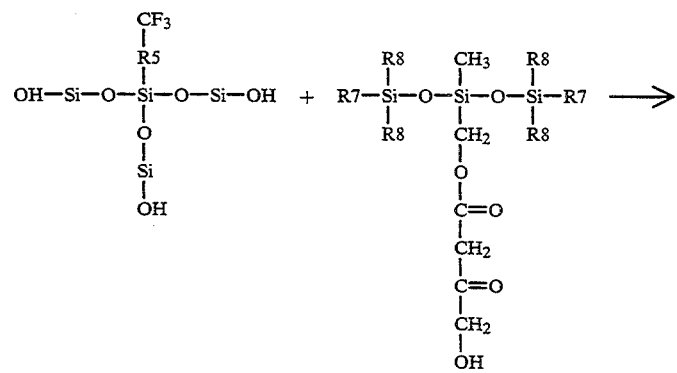

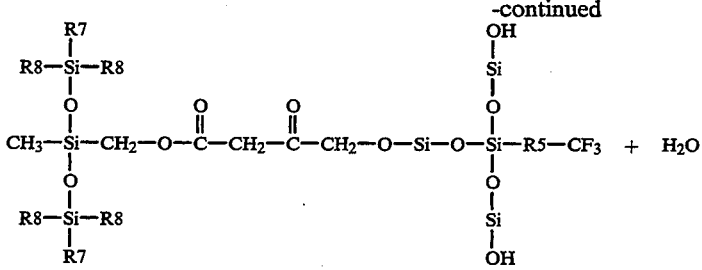

-continued

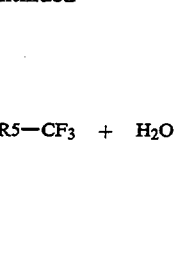

Additionally, the hydroxy substituted fluorinated polysiloxane may undergo homopolycondensation with other hydroxy substituted fluorinated polysiloxane molecules, forming a fluorinated polysiloxane polymer and water as shown in Reaction (5).

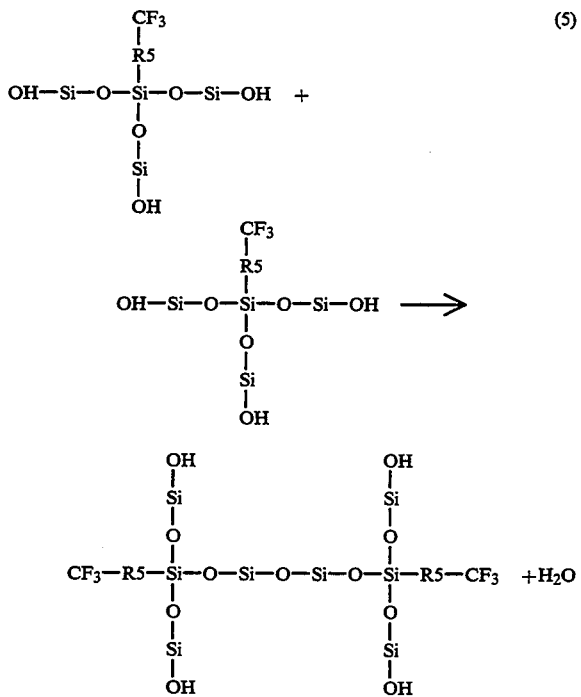

As mentioned previously, the polysiloxane ingredient does not participate in the hydrolytic polycondensation reactions with the other polysiloxane resins but, rather is bound up in the polymerization product formed by the polycondensation reactions, providing lubricity and imposing initial hydrophobic characteristics to the coating during application.

Ultimately, the fluorinated polysiloxane, hydroxy substituted fluorinated polysiloxane, and polyester modified polysiloxane all undergo polycondensation with each other forming an optically clear hydrophobic fluorinated polyester modified polysiloxane polymer network. The formation of the fluorinated polyester modified polysiloxane polymer network is evidenced by an increase in the viscosity of the combined polysiloxane ingredients shortly after the addition of the aqueous acid and alcohol composition.

The hydrolysis of the fluorinated polysiloxane is driven to completion by the addition of water, via both the addition of the aqueous acid and homopolycondensation of the polyester modified polysiloxane. However, the homopolycondensation reactions between the hydroxy substituted fluorinated polysiloxane molecules, the homopolycondensation reactions between polyester modified polysiloxane molecules, and the heteropolycondensation reactions between the hydroxy substituted fluorinated polysiloxane molecules and the polyester modified polysiloxanes, forming the optically clear hydrophobic fluorinated polyester modified polysiloxane polymer network are driven by the evaporation of water. Accordingly, the amount of water used to prepare the coating composition reflects a compromise of competing considerations, i.e., the needed to effect hydrolysis versus the need effect a quick curing coating composition.

The coating composition is applied to a substrate surface exposed to the atmosphere, facilitating the evaporation of the water and, thereby driving the polycondensation reactions forming the optically clear hydrophobic fluorinated polyester modified polysiloxane polymer to completion.

The coating composition prepared according to principles of this invention is an optically clear hydrophobic coating that is resistant to weather, i.e., premature ultraviolet degradation, solvents, acids and heat. The optically clear coating is compatible with a variety of substrates such as masonry, wood, plastic, glass and the like and cures under ambient temperature conditions without need for special curing conditions or special equipment. The coating composition is quick curing, curing completely at ambient temperature and above fifty percent relative humidity in approximately two to three hours. The coating composition may be stored and sold in a single pack system and may be applied by cloth, spray, brush, or roller without the need for thinning or using special application techniques or equipment.

Although limited embodiments of the optically clear hydrophobic coating composition have been described herein, many modifications and variations will be apparent to those skilled in the art. Accordingly, it is to be understood that, within the scope of the appended claims, the optically clear hydrophobic coating composition according to principles of this invention may be prepared other than as specifically described herein.

What is claimed is:

1. An optically clear coating composition having hydrophobic properties prepared by combining:
    a fluorinated polysiloxane in the range of from 0.2 to 1 percent by weight of the total composition;
    a polysiloxane in the range of from 10 to 60 percent by weight of the total composition;
    a polyester modified polysiloxane in the range of from 0.05 to 0.2 percent by weight of the total composition; up to 25 percent by weight of the total composition of an acid;
    water; and
    an alcohol.

2. The optically clear coating as recited in claim 1 wherein the fluorinated polysiloxane has the formula

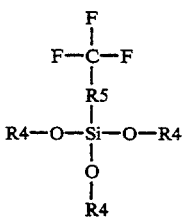

where R4 is selected from the group consisting of alkyl, aryl, alkoxy groups and hydroxy groups, [and]where each R4 group may either be the same or different than other R4 groups, where each R4 comprises in the range of from one to four carbon atoms, and where R5 is an alkane comprising in the range of from two to four carbon atoms.

3. The optically clear coating as recited in claim 1 wherein the polysiloxane has the formula

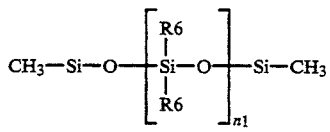

where R6 comprises an alkane having in the range of from one to three carbon atoms, and where each R6 group is the same or different, and where n is in the range of from one to five.

4. The optically clear coating as recited in claim 1 wherein the polyester modified polysiloxane has the formula

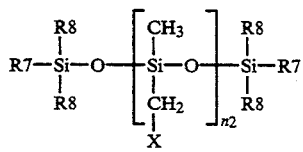

where R7 is selected from the group consisting of alkyl, aryl, and alkoxy groups having in the range of from one to six carbon atoms, where R8 comprises an alkyl group having in the range of from one to three carbon atoms, where $n_2$ is in the range of from one to five, and where X comprises a polyester group.

5. The optically clear coating as recited in claim 4 wherein the polyester group has the formula

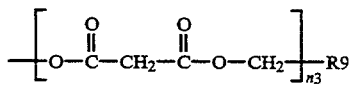

where R9 is selected from the group consisting of a hydroxy and alkoxy group, and where the alkoxy group comprises in the range of from one to five carbon atoms, and where $n_3$ is in the range of from one to two.

6. The optically clear hydrophobic coating as recited in claim 1 wherein the acid is selected from the group consisting of acetic acid and inorganic acids.

7. The optically clear hydrophobic coating as recited in claim 1 comprising acid in the range of from 5 to 25 percent by weight of the total composition.

8. The optically clear hydrophobic coating as recited in claim 1 wherein the alcohol comprises in the range of from one to four carbon atoms.

9. The optically clear hydrophobic coating as recited in claim 1 comprising alcohol in the range of from 40 to 70 percent by weight of the total composition.

10. The optically clear hydrophobic coating as recited in claim 1 wherein the water is selected from the group consisting of free water added to the composition, atmospheric moisture, and water from an aqueous acid.

11. The optically clear hydrophobic coating as recited in claim 10 comprising water in the range of from 0.1 to 10 percent by weight of the total composition.

12. An optically clear hydrophobic coating composition prepared by combining:

a fluorinated polysiloxane in the range of from 0.2 to 1 percent by weight of the total composition, the fluorinated polysiloxane having the formula

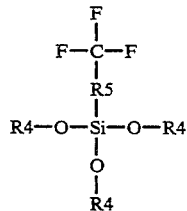

where R4 is selected from the group consisting of alkyl, aryl, alkoxy, and hydroxy groups, [and]where each R4 group is the same or different, and where R5 is an alkane comprising in the range of from two to four carbon atoms;

a polysiloxane in the range of from 10 to 60 percent by weight of the total composition, the polysiloxane having the formula

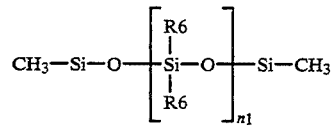

where R6 comprises an alkane having in the range of from one to three carbon atoms, and where each R6 group may be the same or different, and where $n_1$ is in the range of from one to five;

a polyester modified polysiloxane in the range of from 0.05 to 0.2 percent by weight of the total composition;

an acid in the range of from 5 to 25 percent by weight of the total composition;

water; and an alcohol in the range of from 40 to 70 percent by weight of the total composition.

13. The optically clear hydrophobic coating as recited in claim 12 wherein the polyester modified polysiloxane has the formula

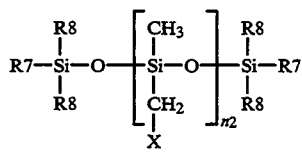

where R7 is selected from the group consisting of alkyl, aryl, and alkoxy groups having in the range of from one to six carbon atoms, where R8 comprises an alkyl group having in the range of from one to three carbon atoms, where $n_2$ is in the range of from one to five, and where X comprises a polyester group.

14. The optically clear hydrophobic coating as recited in claim 13 wherein the polyester group has the formula

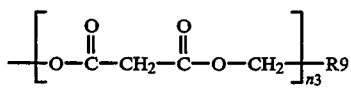

where R9 is selected from the group consisting of a hydroxy and an alkoxy group, and where the alkoxy group comprises in the range of from one to five carbon atoms, and where $n_3$ is in the range of from one to two.

15. The optically clear hydrophobic coating as recited in claim 12 wherein the acid is selected from the group consisting of acetic acid and inorganic acid, and the alcohol comprises in the range of from one to four carbon atoms.

16. An optically clear hydrophobic coating composition prepared by combining:
a fluorinated polysiloxane in the range of from 0.2 to 1 percent by weight of the total composition, the florinated polysiloxane having the formula

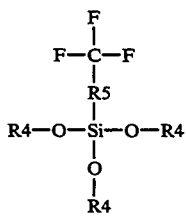

where R4 is selected from the group consisting of alkyl, aryl, alkoxy, and hydroxy groups, and where each R4 group is the same or different, and where R5 is an alkane comprising in the range of from two to four carbon atoms;
a polysiloxane in the range of from 10 to 60 percent by weight of the total composition;
a polyester modified polysiloxane in the range of from 0.05 to 0.2 percent by weight of the total composition, the polyester modified polysiloxane having the formula

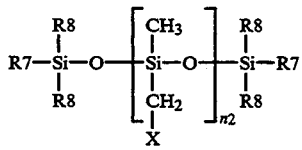

where R7 is selected from the group consisting of alkyl, aryl, and alkoxy groups having in the range of from one to six carbon atoms, where R8 comprises an alkyl group having in the range of from one to three carbon atoms, where $n_2$ is in the range of from one to five, and where X comprises a polyester group;
an acid in the range of from 5 to 25 percent by weight of the total composition;
water; and
an alcohol.

17. The optically clear hydrophobic coating as recited in claim 16 wherein the polyester group has the formula

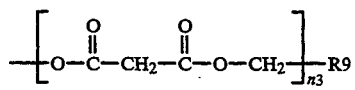

where R9 is selected from the group consisting of a hydroxy and an alkoxy group, and where the alkoxy group comprises in the range of from one to five carbon atoms, and where $n_3$ is in the range of from one to two.

18. The optically clear hydrophobic coating as recited in claim 17 wherein the polysiloxane has the formula

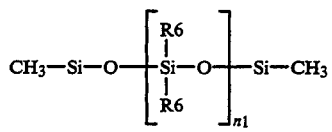

where R6 comprises an alkane having in the range of from one to three carbon atoms, and where each R6 group is the same or different, and where $n_1$ is in the range of from one to five.

19. The optically clear hydrophobic coating as recited in claim 18 wherein the acid is selected from the group consisting of acetic acid and inorganic acids.

20. The optically clear hydrophobic coating as recited in claim 19 wherein the alcohol comprises in the range of from one to four carbon atoms, the coating composition comprising in the range of from forty to seventy percent by weight alcohol.

21. A method for forming an optically clear hydrophobic coating composition comprising the steps of:
combining a fluorinated polysiloxane in the range of from 0.2 to 1 percent by weight of the total composition, wherein the fluorinated polysiloxane has multiple hydrolyzable side groups, with a polysiloxane in the range of from 10 to 60 percent by weight of the total composition and a polyester modified polysiloxane in the range of from 0.05 to 0.2 percent by weight of the total composition to form a polysiloxane composition;
combining an alcohol and up to 25 percent by weight of the total composition of an acid together with water to form an acid composition;
hydrolyzing the fluorinated polysiloxane, polysiloxane, and polyester modified polysiloxane by adding the aqueous acid composition to the polysiloxane composition; and
polymerizing the hydrolyzed fluorinated polysiloxane, polysiloxane, and polyester modified polysiloxane to form a fluorinated polyester modified polysiloxane polymer network.

22. The method as recited in claim 21 wherein the fluorinated polysiloxane has the formula

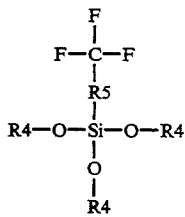

where R4 is selected from the group consisting of alkyl, aryl, alkoxy, and hydroxy groups, where each R4 group is the same or different, where each R4 comprises in the range of from one to four carbon atoms, and where R5 is an alkane comprising in the range of from two to four carbon atoms.

23. The method as recited in claim 21 wherein the polysiloxane has the formula

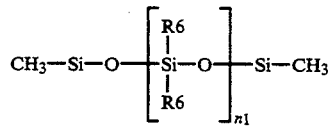

where R6 comprises an alkane having in the range of from one to three carbon atoms, and where each R6 group is the same or different, and where n is in the range of from one to five.

24. The method as recited in claim 21 wherein the polyester modified polysiloxane has the formula

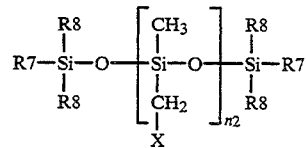

where R7 is selected from the group consisting of alkyl, aryl, and alkoxy groups having in the range of from one to six carbon atoms, where R8 comprises an alkyl group having in the range of from one to three carbon atoms, where $n_2$ is in the range of from one to five, and where X comprises a polyester group.

25. The method as recited in claim 21 wherein the polyester modified polysiloxane comprises a polyester group having the formula

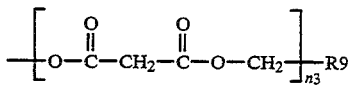

where R9 is selected from the group consisting of a hydroxy and an alkoxy group, and where the alkoxy group comprises in the range of from one to five carbon atoms, and where $n_3$ is in the range of from one to two.

26. The method as recited in claim 21 comprising a further step of diluting the combined polysiloxane composition and acid composition to control the rate of polymerization by adding solvent until the combined polysiloxane composition and acid composition is approximately 20 percent by weight of the total composition.

* * * * *

UNITED STATES PATENT AND TRADEMARK OFFICE
CERTIFICATE OF CORRECTION

PATENT NO. : 5,417,744
DATED : May 23, 1995
INVENTOR(S) : Roland L. Gasmena

It is certified that error appears in the above-indentified patent and that said Letters Patent is hereby corrected as shown below:

```
Column 3,  line 30, change "n₂is" to -- n₂ is --.
Column 4,  line 32, change "n₃may" to -- n₁ may --.
Column 4,  line 33, after "where" change "n" to -- n₁ --.
Column 6,  line 37, change "n?" to -- n₂ --.
Column 9,  lines 49, 15-18, on line 49 delete "R4OH" and
           insert between Reactions (2) and (3) after
           "CF₃ +".
Column 9,  lines 18, 19, insert a space between
           Reactions (2) and (3).
Column 13, line 13, delete " [and]".
Column 13, line 31, after "where" change "n" to -- n₁ --.
Column 13, line 49, change "n₂is" to -- n₂ is --.
Column 14, line 36, before "where" delete " [and]".
Column 17, line 32, after "where" change "n" to -- n₁ --.
```

Signed and Sealed this

Thirty-first Day of October 1995

Attest:

BRUCE LEHMAN

*Attesting Officer*        *Commissioner of Patents and Trademarks*